US011902303B2

(12) United States Patent
Gong et al.

(10) Patent No.: US 11,902,303 B2
(45) Date of Patent: *Feb. 13, 2024

(54) SYSTEM AND METHOD FOR DETECTING LATERAL MOVEMENT AND DATA EXFILTRATION

(71) Applicant: Cyphort Inc., Santa Clara, CA (US)

(72) Inventors: Fengmin Gong, Los Altos Hills, CA (US); Alexander Burt, San Jose, CA (US); Frank Jas, Scotts Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,040

(22) Filed: Jul. 29, 2022

(65) Prior Publication Data

US 2023/0030659 A1 Feb. 2, 2023

Related U.S. Application Data

(63) Continuation of application No. 16/437,262, filed on Jun. 11, 2019, now Pat. No. 11,405,410, which is a
(Continued)

(51) Int. Cl.
*H04L 9/40* (2022.01)
*G06F 21/57* (2013.01)
(Continued)

(52) U.S. Cl.
CPC ........ *H04L 63/1416* (2013.01); *G06F 21/552* (2013.01); *G06F 21/554* (2013.01);
(Continued)

(58) Field of Classification Search
None
See application file for complete search history.

(56) References Cited

U.S. PATENT DOCUMENTS

| 7,114,183 B1 | 9/2006 | Joiner |
| 7,237,264 B1 | 6/2007 | Graham et al. |

(Continued)

FOREIGN PATENT DOCUMENTS

| CN | 101436967 A | 5/2009 |
| CN | 102160048 A | 8/2011 |
| CN | 102546641 A | 7/2012 |
| CN | 102799822 A | 11/2012 |
| CN | 103782303 A | 5/2014 |

(Continued)

OTHER PUBLICATIONS

Bayer U., "TTAnalyze: A Tool for Analyzing Malware," Master's Thesis, Technical University of Vienna, Dec. 12, 2005, 80 pages.
(Continued)

*Primary Examiner* — Michael W Chao
(74) *Attorney, Agent, or Firm* — Harrity & Harrity, LLP

(57) ABSTRACT

A system configured to detect a threat activity on a network. The system including a digital device configured to detect a first order indicator of compromise on a network, detect a second order indicator of compromise on the network, generate a risk score based on correlating said first order indicator of compromise on the network with the second order indicator of compromise on said network, and generate at least one incident alert based on comparing the risk score to a threshold.

20 Claims, 5 Drawing Sheets

Related U.S. Application Data continuation of application No. 14/936,612, filed on Nov. 9, 2015, now Pat. No. 10,326,778, which is a continuation-in-part of application No. 14/629,444, filed on Feb. 23, 2015, now Pat. No. 9,686,293.

(60) Provisional application No. 61/944,006, filed on Feb. 24, 2014.

(51) Int. Cl.
*G06F 21/56* (2013.01)
*G06F 21/55* (2013.01)

(52) U.S. Cl.
CPC .......... *G06F 21/561* (2013.01); *G06F 21/564* (2013.01); *G06F 21/577* (2013.01); *H04L 63/0876* (2013.01); *H04L 63/102* (2013.01); *H04L 63/145* (2013.01); *H04L 63/1425* (2013.01); *G06F 2221/2111* (2013.01)

(56) References Cited

U.S. PATENT DOCUMENTS

| | | | |
|---|---|---|---|
| 7,418,729 B2 | 8/2008 | Szor et al. | |
| 7,540,030 B1 | 5/2009 | Zaitsev et al. | |
| 7,664,626 B1 | 2/2010 | Ferrie et al. | |
| 7,721,331 B1 | 5/2010 | Rowe et al. | |
| 7,725,937 B1 | 5/2010 | Levy et al. | |
| 7,735,116 B1 | 6/2010 | Gauvin | |
| 7,779,463 B2 | 8/2010 | Stolfo et al. | |
| 7,854,003 B1 * | 12/2010 | Strayer ............... H04L 63/1433 726/23 | |
| 7,996,912 B2 | 8/2011 | Spalink et al. | |
| 8,060,074 B2 | 11/2011 | Danford et al. | |
| 8,108,912 B2 | 1/2012 | Ferris et al. | |
| 8,151,352 B1 | 4/2012 | Novitchi et al. | |
| 8,176,477 B2 | 5/2012 | Wu et al. | |
| 8,204,984 B1 | 6/2012 | Aziz et al. | |
| 8,266,698 B1 | 9/2012 | Seshardi et al. | |
| 8,375,444 B2 | 2/2013 | Aziz et al. | |
| 8,375,450 B1 | 2/2013 | Oliver et al. | |
| 8,407,797 B1 | 3/2013 | Novitchi et al. | |
| 8,495,740 B1 | 7/2013 | Rouland et al. | |
| 8,516,589 B2 | 8/2013 | Jeong et al. | |
| 8,549,643 B1 * | 10/2013 | Shou ...................... G06F 21/556 455/410 | |
| 8,555,385 B1 | 10/2013 | Bhatkar et al. | |
| 8,555,388 B1 | 10/2013 | Wang et al. | |
| 8,745,734 B1 | 6/2014 | Brandwine et al. | |
| 8,751,490 B1 | 6/2014 | Cooley et al. | |
| 8,769,683 B1 | 7/2014 | Oliver et al. | |
| 8,862,739 B2 | 10/2014 | Brownlow et al. | |
| 8,881,289 B2 | 11/2014 | Basavapatna et al. | |
| 8,984,581 B2 | 3/2015 | Luna et al. | |
| 9,009,828 B1 | 4/2015 | Ramsey et al. | |
| 9,043,905 B1 * | 5/2015 | Allen ...................... H04L 63/20 726/22 | |
| 9,043,920 B2 * | 5/2015 | Gula .................. H04L 63/1433 709/224 | |
| 9,141,790 B2 | 9/2015 | Roundy et al. | |
| 9,185,095 B1 | 11/2015 | Moritz et al. | |
| 9,294,498 B1 | 3/2016 | Yampolskiy et al. | |
| 9,311,479 B1 * | 4/2016 | Manni ................... G06F 21/554 | |
| 9,356,942 B1 * | 5/2016 | Joffe ................... H04L 63/1408 | |
| 9,495,188 B1 | 11/2016 | Ettema et al. | |
| 9,519,781 B2 | 12/2016 | Golshan et al. | |
| 9,609,009 B2 | 3/2017 | Muddu et al. | |
| 9,609,010 B2 | 3/2017 | Sipple et al. | |
| 9,609,011 B2 | 3/2017 | Muddu et al. | |
| 9,641,544 B1 | 5/2017 | Treat et al. | |
| 9,667,641 B2 | 5/2017 | Muddu et al. | |
| 9,686,293 B2 | 6/2017 | Golshan et al. | |
| 9,699,205 B2 | 7/2017 | Muddu et al. | |
| 9,754,117 B2 | 9/2017 | Bender et al. | |
| 9,923,918 B2 | 3/2018 | Nicodemus et al. | |
| 9,954,896 B2 | 4/2018 | Hathaway et al. | |
| 10,032,020 B2 | 7/2018 | Reybok et al. | |
| 10,044,821 B2 | 8/2018 | Spektor et al. | |
| 10,057,285 B2 | 8/2018 | Choudhary et al. | |
| 10,095,866 B2 | 10/2018 | Gong et al. | |
| 10,129,270 B2 | 11/2018 | Doctor et al. | |
| 10,129,288 B1 | 11/2018 | Xie et al. | |
| 10,277,629 B1 * | 4/2019 | Guntur ................. G06F 16/285 | |
| 10,326,778 B2 | 6/2019 | Gong et al. | |
| 10,404,728 B2 * | 9/2019 | Sartran .................. H04L 43/12 | |
| 10,601,848 B1 * | 3/2020 | Jeyaraman .......... H04L 63/1416 | |
| 10,855,700 B1 * | 12/2020 | Jeyaraman .......... H04L 63/1425 | |
| 10,958,679 B2 | 3/2021 | Kirti et al. | |
| 10,972,492 B2 | 4/2021 | Ogawa | |
| 11,075,930 B1 * | 7/2021 | Xavier ............... H04L 63/1425 | |
| 11,405,410 B2 | 8/2022 | Gong et al. | |
| 11,637,857 B1 * | 4/2023 | Aziz ................... H04L 63/0245 726/23 | |
| 2003/0084349 A1 * | 5/2003 | Friedrichs .............. G06F 21/55 726/22 | |
| 2004/0111632 A1 | 6/2004 | Halperin | |
| 2004/0117478 A1 | 6/2004 | Triulzi et al. | |
| 2004/0128543 A1 * | 7/2004 | Blake .................. H04L 63/1491 709/224 | |
| 2004/0168173 A1 * | 8/2004 | Cohen ..................... G06F 21/55 719/310 | |
| 2005/0015624 A1 | 1/2005 | Ginter et al. | |
| 2005/0081053 A1 | 4/2005 | Aston et al. | |
| 2005/0086500 A1 | 4/2005 | Albornoz | |
| 2005/0166072 A1 * | 7/2005 | Converse ............. H04L 63/1441 726/5 | |
| 2006/0010440 A1 | 1/2006 | Anderson et al. | |
| 2006/0018466 A1 * | 1/2006 | Adelstein ............ H04L 63/1425 380/46 | |
| 2006/0101516 A1 * | 5/2006 | Sudaharan .......... H04L 63/0263 726/23 | |
| 2006/0161816 A1 * | 7/2006 | Gula .................... H04L 63/1425 714/39 | |
| 2006/0161982 A1 | 7/2006 | Chari et al. | |
| 2006/0173992 A1 | 8/2006 | Weber et al. | |
| 2006/0265746 A1 | 11/2006 | Farley et al. | |
| 2007/0180490 A1 | 8/2007 | Renzi et al. | |
| 2007/0226796 A1 | 9/2007 | Gilbert et al. | |
| 2007/0244987 A1 | 10/2007 | Pedersen et al. | |
| 2007/0250930 A1 | 10/2007 | Aziz et al. | |
| 2008/0016570 A1 | 1/2008 | Capalik et al. | |
| 2008/0086776 A1 | 4/2008 | Tuvell et al. | |
| 2008/0098476 A1 * | 4/2008 | Syversen ............ H04L 63/0227 726/23 | |
| 2008/0216175 A1 | 9/2008 | Pike et al. | |
| 2008/0250497 A1 | 10/2008 | Mullarkey et al. | |
| 2008/0256619 A1 * | 10/2008 | Neystadt ................ G06F 21/577 726/5 | |
| 2009/0013405 A1 | 1/2009 | Schipka | |
| 2009/0028135 A1 * | 1/2009 | Mantripragada ....... H04L 12/66 370/352 | |
| 2010/0064299 A1 | 3/2010 | Kacin et al. | |
| 2010/0077481 A1 | 3/2010 | Polyakov et al. | |
| 2010/0115621 A1 | 5/2010 | Staniford et al. | |
| 2010/0121916 A1 | 5/2010 | Lin | |
| 2010/0192223 A1 | 7/2010 | Ismael et al. | |
| 2010/0257580 A1 | 10/2010 | Zhao | |
| 2011/0041179 A1 | 2/2011 | Staahlberg et al. | |
| 2011/0054879 A1 | 3/2011 | Bogsanyl et al. | |
| 2011/0055123 A1 | 3/2011 | Kennedy et al. | |
| 2011/0126111 A1 | 5/2011 | Gill et al. | |
| 2011/0138470 A1 | 6/2011 | Davis et al. | |
| 2011/0138471 A1 | 6/2011 | Van De Weyer et al. | |
| 2011/0145926 A1 | 6/2011 | Dalcher et al. | |
| 2011/0167494 A1 | 7/2011 | Bowen et al. | |
| 2011/0225655 A1 | 9/2011 | Niemelae et al. | |
| 2011/0247072 A1 | 10/2011 | Staniford et al. | |
| 2011/0271343 A1 | 11/2011 | Kim et al. | |
| 2011/0302656 A1 | 12/2011 | El-Moussa et al. | |
| 2012/0011590 A1 | 1/2012 | Donovan et al. | |
| 2012/0066763 A1 | 3/2012 | McHugh et al. | |
| 2012/0084866 A1 * | 4/2012 | Stolfo ................. H04L 63/1416 726/25 | |

(56) References Cited

U.S. PATENT DOCUMENTS

| | | | |
|---|---|---|---|
| 2012/0110672 A1 | 5/2012 | Judge et al. | |
| 2012/0272317 A1 | 10/2012 | Rubin et al. | |
| 2012/0311562 A1 | 12/2012 | Wang et al. | |
| 2013/0097701 A1* | 4/2013 | Moyle | H04L 63/1416 726/22 |
| 2013/0097706 A1 | 4/2013 | Titonis et al. | |
| 2013/0104236 A1 | 4/2013 | Ray et al. | |
| 2013/0111540 A1 | 5/2013 | Sabin et al. | |
| 2013/0117849 A1 | 5/2013 | Golshan et al. | |
| 2013/0227691 A1 | 8/2013 | Aziz et al. | |
| 2013/0263260 A1 | 10/2013 | Mahaffey et al. | |
| 2013/0276114 A1 | 10/2013 | Friedrichs et al. | |
| 2013/0298230 A1 | 11/2013 | Kumar et al. | |
| 2013/0298244 A1 | 11/2013 | Kumar et al. | |
| 2013/0303159 A1 | 11/2013 | Gathala et al. | |
| 2013/0305357 A1 | 11/2013 | Ayyagari et al. | |
| 2013/0312096 A1 | 11/2013 | Larsen et al. | |
| 2013/0318568 A1 | 11/2013 | Mahaffey et al. | |
| 2014/0090061 A1 | 3/2014 | Avasarala et al. | |
| 2014/0165140 A1 | 6/2014 | Singla et al. | |
| 2014/0189861 A1 | 7/2014 | Gupta et al. | |
| 2015/0007312 A1 | 1/2015 | Pidathala et al. | |
| 2015/0106867 A1 | 4/2015 | Liang | |
| 2015/0106927 A1 | 4/2015 | Ferragut et al. | |
| 2015/0128263 A1 | 5/2015 | Raugas et al. | |
| 2015/0128274 A1 | 5/2015 | Giokas | |
| 2015/0135262 A1 | 5/2015 | Porat et al. | |
| 2015/0163121 A1 | 6/2015 | Mahaffey et al. | |
| 2015/0172300 A1 | 6/2015 | Cochenour et al. | |
| 2015/0172321 A1 | 6/2015 | Kirti et al. | |
| 2015/0180883 A1 | 6/2015 | Aktas et al. | |
| 2015/0205954 A1 | 7/2015 | Jou et al. | |
| 2015/0215334 A1 | 7/2015 | Bingham et al. | |
| 2015/0244730 A1 | 8/2015 | Vu et al. | |
| 2015/0319185 A1 | 11/2015 | Kirti et al. | |
| 2015/0373039 A1 | 12/2015 | Wang | |
| 2016/0019388 A1 | 1/2016 | Singla et al. | |
| 2016/0034361 A1* | 2/2016 | Block | G06F 11/079 714/4.12 |
| 2016/0191559 A1 | 6/2016 | Mhatre et al. | |
| 2016/0191567 A1 | 6/2016 | Chahal et al. | |
| 2016/0205122 A1 | 7/2016 | Bassett et al. | |
| 2016/0212165 A1 | 7/2016 | Singla et al. | |
| 2016/0226905 A1 | 8/2016 | Baikalov et al. | |
| 2016/0234239 A1 | 8/2016 | Knapp et al. | |
| 2016/0308898 A1 | 10/2016 | Teeple et al. | |
| 2016/0337400 A1 | 11/2016 | Gupta et al. | |
| 2016/0371489 A1 | 12/2016 | Puri et al. | |
| 2016/0373478 A1 | 12/2016 | Doubleday et al. | |
| 2017/0063905 A1 | 3/2017 | Muddu et al. | |
| 2017/0223046 A1* | 8/2017 | Singh | H04L 63/1491 |
| 2017/0230402 A1* | 8/2017 | Greenspan | H04W 12/08 |
| 2017/0277873 A1 | 9/2017 | Bailor et al. | |
| 2017/0339178 A1 | 11/2017 | Mahaffey et al. | |
| 2017/0339186 A1* | 11/2017 | Gurvich | H04L 61/5007 |
| 2018/0048667 A1 | 2/2018 | Tang et al. | |
| 2018/0288079 A1 | 10/2018 | Muddu et al. | |
| 2018/0314996 A1 | 11/2018 | Singh et al. | |
| 2018/0337941 A1* | 11/2018 | Kraning | H04L 43/16 |
| 2019/0156257 A1 | 5/2019 | Datta Ray | |
| 2021/0176267 A1 | 6/2021 | Yampolskiy et al. | |

FOREIGN PATENT DOCUMENTS

| | | | |
|---|---|---|---|
| CN | 103842965 A | 6/2014 | |
| CN | 104468545 A | 3/2015 | |
| WO | 03083660 A1 | 10/2003 | |

OTHER PUBLICATIONS

Bhatt P., et al., Analyzing Targeted Attacks using Hadoop applied to Forensic Investigation, Retrieved from the Internet: http://icofcs.org/2013/ICoFCS-2013-004.pdf, 2013, pp. 1-6(as printed).

Cavallaro, L., et al,, "Anti-Taint-Analysis: Practical Evasion Techniques Against Information Flow Based Malware Defence," Secure Systems Lab at Stony Brook University, Tech, Rep, Nov. 2007, pp. 1-18.

Chen, X., et al., "Towards an Understanding of Anti-Virtualization and Anti-Debugging Behaviour in Modern Malware," In Proceedings of the 38th Annual IEEE International Conference on Dependable Systems and Networks (DSN), Jun. 24, 2008, 10 pages.

Extended European Search Report for Application No. EP12844780.2, dated Jul. 22, 2015, 5 pages.

Extended European Search Report for Application No. EP12845692.8, dated Oct. 8, 2015, 10 pages.

Extended European Search Report for Application No. EP15752327, dated Sep. 26, 2017, 7 pages.

Extended European Search Report for Application No. EP16167215.9, dated Sep. 28, 2016, 9 pages.

Extended European Search Report for Application No. EP20201384.3, dated Jan. 12, 2021, 7 pages.

Extended European Search Report for Application No. EP16864948.1, dated Jun. 13, 2019, 6 pages.

Final Office Action for U.S. Appl. No. 14/629,435, dated Dec. 22, 2016, 30 pages.

Final Office Action for U.S. Appl. No. 14/629,444, dated Jun. 9, 2016, 16 pages.

Final Office Action dated Feb. 19, 2014, for U.S. Appl. No. 13/288,905.

Final Office Action dated Jul. 13, 2015, for U.S. Appl. No. 13/288,917.

Final Office Action dated Jun. 30, 2014, for U.S. Appl. No. 13/288,917.

Final Office Action dated Jun. 4, 2015, for U.S. Appl. No. 13/288,905.

Final Office Action dated Mar. 21, 2017, for U.S. Appl. No. 13/288,917.

Ho, A., et al., "Practical Taint-Based Protection Using Demand Emulation," EuroSys '06, Proceedings of the 1st ACM SIGOPS/EuroSys European Conference on Computer Systems, Oct. 2006, vol. 40(4), pp. 29-41.

International Search Report and Written Opinion for International Application No. PCT/US2012/063566, dated Jan. 22, 2013.

International Search Report and Written Opinion for International Application No. PCT/US2012/063569, dated Jan. 18, 2013.

International Search Report and Written Opinion for International Application No. PCT/US2015/017389, dated Dec. 11, 2015.

International Search Report and Written Opinion for International Application No. PCT/US2015/017394, dated Jun. 10, 2015, 7 pages.

International Search Report and Written Opinion for International Application No. PCT/US2016/061199, dated Feb. 6, 2017, 6 pages.

International Search Report and Written Opinion for International Application No. PCT/US2016/061201, dated Feb. 7, 2017, 7 pages.

Kang, M.G., et al., "Emulating Emulation-Resistant Malware," In Proceedings of the Workshop on Virtual Machine Security (VMSec), Nov. 9, 2009.

Non-Final Office Action for U.S. Appl. No. 14/629,435, dated Jun. 15, 2017, 27 pages.

Non-Final Office Action for U.S. Appl. No. 14/629,444, dated Feb. 9, 2016, 13 pages.

Non-Final Office Action for U.S. Appl. No. 14/936,593, dated Apr. 7, 2017, 13 pages.

Non-Final Office Action for U.S. Appl. No. 14/936,612, dated Apr. 21, 2017, 15 pages.

Non-Final Office Action dated Apr. 1, 2016, for U.S. Appl. No. 14/629,435.

Non-Final Office Action dated Dec. 3, 2014, for U.S. Appl. No. 13/288,917.

Non-Final Office Action dated Jan. 20, 2016, for U.S. Appl. No. 13/288,905.

Non-Final Office Action dated Jun. 1, 2016, for U.S. Appl. No. 13/288,917.

Non-Final Office Action dated May 21, 2013, for U.S. Appl. No. 13/288,905.

Non-Final Office Action dated Oct. 23, 2014, for U.S. Appl. No. 13/288,905.

(56) References Cited

OTHER PUBLICATIONS

Non-Final Office Action dated Sep. 12, 2013, for U.S. Appl. No. 13/288,917.
Notice of Allowance for U.S. Appl. No. 13/288,905, dated Aug. 2, 2016, 15 pages.
Notice of Allowance for U.S. Appl. No. 13/288,917, dated Aug. 11, 2017, 9 pages.
Notice of Allowance for U.S. Appl. No. 14/629,444, dated Nov. 4, 2016, 10 pages.
Supplemental Notice of Allowance for U.S. Appl. No. 13/288,905, dated Sep. 6, 2016, 2 pages.
Supplemental Notice of Allowance for U.S. Appl. No. 14/629,444, dated Feb. 16, 2017, 5 pages.
Supplementary European Search Report for Application No. EP16864949.9, dated Mar. 1, 2019, 7 pages.
Zhang X-S., et al., "A Practical Taint-Based Malware Detection," International Conference on Apperceiving Computing and Intelligence Analysis, Dec. 2008, pp. 73-77.

* cited by examiner

SYSTEM AND METHOD FOR DETECTING LATERAL MOVEMENT AND DATA EXFILTRATION

CROSS-REFERENCE TO RELATED APPLICATIONS

This application is a continuation of U.S. patent application Ser. No. 16/437,262, filed on Jun. 11, 2019 (now U.S. Pat. No. 11,405,410), which is a continuation of U.S. patent application Ser. No. 14/936,612, filed on Nov. 9, 2015 (now U.S. Pat. No. 10,326,778), which is a continuation-in-part of U.S. patent application Ser. No. 14/629,444, filed on Feb. 23, 2015 (now U.S. Pat. No. 9,686,293), which claims priority from U.S. Provisional Patent Application No. 61/944,006, filed on Feb. 24, 2014, each are hereby incorporated by reference in their entireties.

FIELD

Embodiments of the invention relate to protecting computers and networks from malicious software and activities. In particular, embodiments of the invention relate to a system and method for detection of lateral movement and data exfiltration.

BACKGROUND

As computer networks grow and the amount of data stored on computers and databases interconnected by those networks grows, so have attempts to gain unauthorized access to these computers and databases. Such attempts to gain unauthorized access to computers and databases may include methodical reconnaissance of potential victims to identify traffic patterns and existing defenses. A technique used to gain unauthorized access to computers and databases includes loading malicious software or malware onto a computer. Such malware is designed to disrupt computer operation, gather sensitive information, or to grant access to the computer to unauthorized individuals.

As the awareness of malware increases, the techniques used to load malware onto computers (also called a malware infection) has grown more sophisticated. As a result, legacy security solutions that use a structured process (e.g., signature and heuristics matching) or analyze agent behavior in an isolated context fail to detect threat activities including, but not limited to, loading malware, lateral movement, data exfiltration, fraudulent transactions, and inside attacks.

The failure to detect these types of threat activities on a computer or network can result in loss of high value data, down time or destruction of infected computers and/or the networks, lost productivity, and a high cost to recover and repair the infected computers and/or networks. Further, current security solutions that are focused on detecting the threat acts of infecting or penetrating a target system fail to detect the increasingly sophisticated malware on the complex business applications and network technologies used in current systems, because complex applications and protocols allow threat acts to hide more easily to evade detection. Further, the current security solutions fail to detect data exfiltration by the malware, which prevents an enterprise from properly assessing and controlling any damage that occurs from malware infecting a system. These types of detection security solutions fail to detect social-engineering attacks on employees and infection of malware caused by rogue or disgruntled employees.

SUMMARY

A system configured to detect a threat activity on a network. The system including a digital device configured to detect one or more first order indicators of compromise on a network, detect one or more second order indicators of compromise on the network, generate a risk score based on correlating said first order indicator of compromise on the network with the second order indicator of compromise on said network, and generate at least one incident alert based on comparing the risk score to a threshold.

Other features and advantages of embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a system to detect threat activities are configured to detect one or more threat activities at advanced stages of a threat kill chain, including lateral movement of malware objects inside networks and enterprises, data gathering and exfiltration, and compromised or fraudulent business transactions. The system is configured to extend protection coverage to the complete kill chain.

A system, according to an embodiment, is configured to monitor simultaneously north-south traffic and east-west traffic. Such a system configured with multiple collectors for monitoring north-south traffic and east-west traffic. North-south traffic monitoring will detect threat activity between internal (e.g., corporate network or LAN) devices and external (e.g., extranet or Internet) devices, including but not limited to web servers. East-west traffic monitoring will detect threat activities among internal devices, including those in a demilitarized zone ("DMZ") otherwise known as a perimeter network. East-west traffic can contain the same set of network protocols seen on north-south boundaries, as well as network protocols meant for internal access and data sharing. Examples of east-west protocols include, but are not limited to, reliable user datagram protocol ("RDP") for remote access to windows computers, active directory services, and server message block ("SMB") for file sharing. Embodiments of the system that deploy collectors to monitor both north-south and east-west traffic, and analyze them through first order and second order indicators extraction, and correlate them in a centralized location and interface, that is a single pane of glass, provide the benefit of detecting threats regardless of which stage they are at in the kill chain, or if the threat is an external or an inside attack, or if the threat is the lateral movement of an infiltration.

Figure 1:
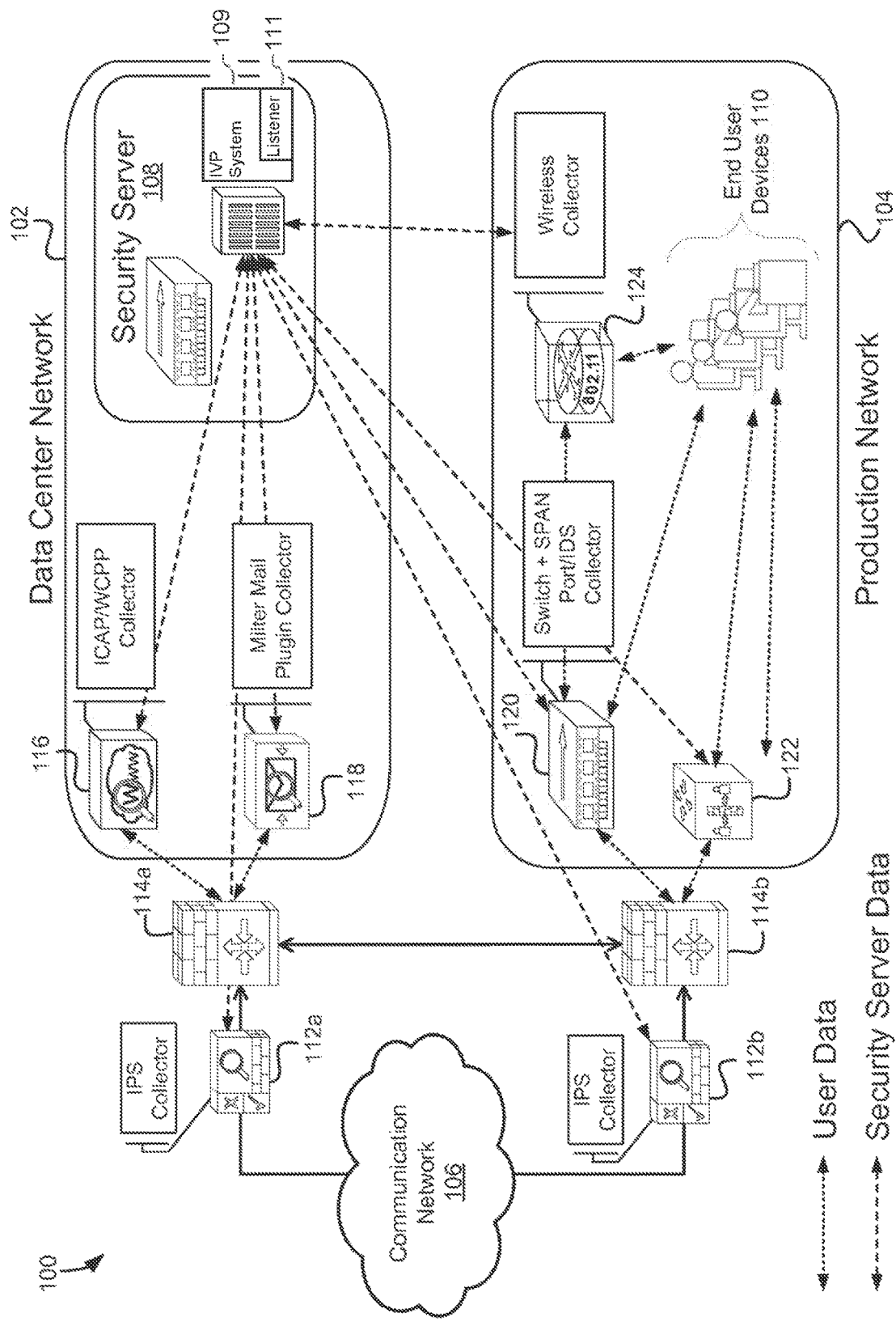
FIG. 1 illustrates a block diagram of a network environment that includes a system configured to detect threat activities according to an embodiment.
Figure 4:
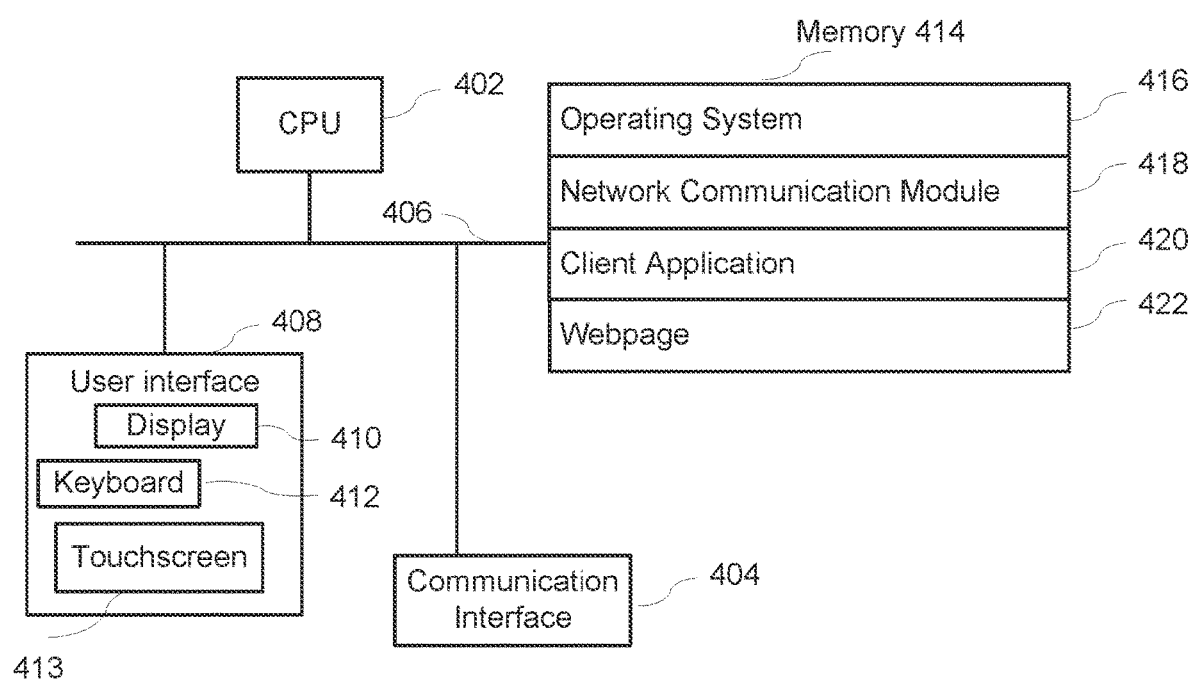
FIG. 4 illustrates an embodiment of a client, an end-user device, or a digital device according to an embodiment.
Figure 5:
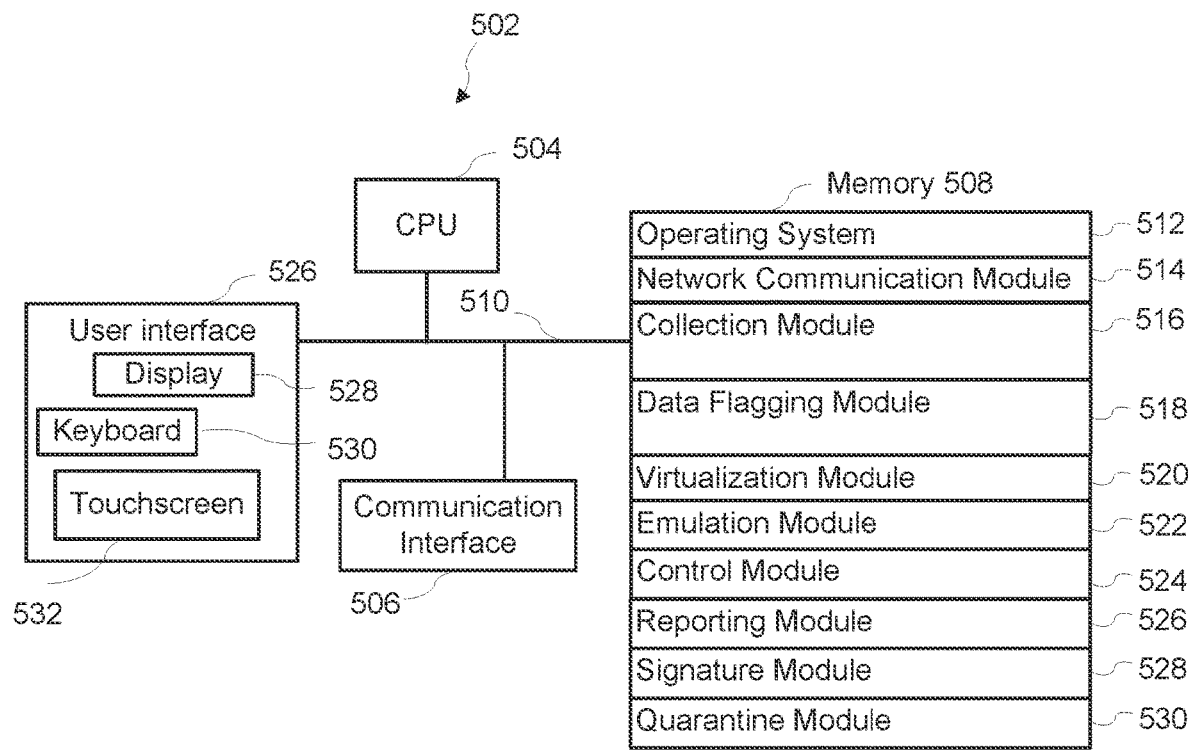
FIG. 5 illustrates an embodiment of a system for detecting threat activities according to an embodiment.

FIG. 1 illustrates a block diagram of a network environment 100 that includes a system configured to detect threat activities according to an embodiment. Systems and methods embodied in the network environment 100 may detect threat activity, malicious activity, identify malware, identify exploits, take preventive action, generate signatures, generate reports, determine malicious behavior, determine targeted information, recommend steps to prevent attack, and/or provide recommendations to improve security. The network environment 100 comprises a data center network 102 and a production network 104 that communicate over a communication network 106. The data center network 102 comprises a security server 108. The production network 104 comprises a plurality of end-user devices 110. The security server 108 and the end-user devices 110 may include digital devices. A digital device is any device with one or more a processing units and memory. FIGS. 4 and 5 illustrate embodiments of a digital device.

The security server 108 is a digital device configured to detect threat activities. For an embodiment, the security server 108 receives suspicious data from one or more data collectors. The data collectors may be resident within or in communication with network devices such as Intrusion Prevention System ("IPS") collectors 112a and 112b, firewalls 114a and 114b, ICAP/WCCP collectors 116, milter mail plug-in collectors 118, switch collectors 120, and/or access points 124. Those skilled in the art will appreciate that a collector and a network device may be two separate digital devices (e.g., see F/W collector and IDS collector).

For an embodiment, data collectors may be at one or more points within the communication network 106. A data collector, which may include a tap or span port (e.g., span port IDS collector at switch 120) for example, is configured to intercept network data from a network. The data collector may be configured to detect suspicious data. Suspicious data is any data collected by the data collector that has been flagged as suspicious by the data collector and/or any data that is to be further processed within the virtualization environment.

The data collectors may filter the data before flagging the data as suspicious and/or providing the collected data to the security server 108. For example, the data collectors may filter out plain text but collect executables or batch files. Further, according to an embodiment, the data collectors may perform intelligent collecting. For example, data may be hashed and compared to a whitelist. The whitelist may identify data that is safe. In one example, the whitelist may identify digitally signed data by trusted entities or data received from a known trusted source as safe. Further, the whitelist may identify previously received information that has been determined to be safe. If data has been previously received, tested within the environments, and determined to be sufficiently trustworthy, the data collector may allow the data to continue through the network. Those skilled in the art will appreciate that the data collectors (or agents associated with the data collectors) may be updated by the security server 108 to help the data collectors recognize sufficiently trustworthy data and to take corrective action (e.g., quarantine and alert an administrator) if untrustworthy data is recognized. For an embodiment, if data is not identified as safe, the data collectors may flag the data as suspicious for further assessment.

Those skilled in the art will appreciate that one or more agents or other modules may monitor network traffic for common behaviors and may configure a data collector to collect data when data is directed in a manner that falls outside normal parameters. For example, the agent may determine or be configured to detect that a computer has been deactivated, a particular computer does not typically receive any data, data received by a particular computer typically comes from a limited number of sources, or a particular computer typically does not send data of a given pattern to certain destinations. If data is directed to a digital device in a manner that is not typical, the data collector may flag such data as suspicious and provide the suspicious data to the security server 108.

Network devices include any device configured to receive and provide data over a network. Examples of network devices include, but are not limited to, routers, bridges, security appliances, firewalls, web servers, mail servers, wireless access points (e.g., hotspots), and switches. For some embodiments, network devices include IPS collectors 112a and 112b, firewalls 114a and 114b, Internet content adaptation protocol ("ICAP")/web cache communication protocol ("WCCP") servers 116, devices including milter mail plug-ins 118, switches 120, and/or access points 124. The IPS collectors 112a and 112b may include any anti-malware device including IPS systems, intrusion detection and prevention systems ("IDPS"), or any other kind of network security appliances. The firewalls 114a and 114b may include software and/or hardware firewalls. For an embodiment, the firewalls 114a and 114b may be embodied within routers, access points, servers (e.g., web servers), mail filters, or appliances.

ICAP/WCCP servers 116 include any web server or web proxy server configured to allow access to a network and/or the Internet. Network devices including milter mail plug-ins 118 may include any mail server or device that provides mail and/or filtering functions and may include digital devices that implement milter, mail transfer agents ("MTAs"), sendmail, and postfix, for example. Switches 120 include any switch or router. In some examples, the data collector may be implemented as a TAP, SPAN port, and/or intrusion detection system ("IDS"). Access points 124 include any device configured to provide wireless connectivity with one or more other digital devices.

The production network 104 is any network that allows one or more end-user devices 110 to communicate over the communication network 106. The communication network 106 is any network that may carry data (encoded, compressed, and/or otherwise) from one digital device to another. In some examples, the communication network 106 may comprise a LAN and/or WAN. Further, the communication network 106 may comprise any number of networks. For some embodiments, the communication network 106 is the Internet.

FIG. 1 is exemplary and does not limit systems and methods described herein to the use of only those technologies depicted. For example, data collectors may be implemented in any web or web proxy server and is not limited to only the servers that implement Internet content adaption protocol ("ICAP") and/or web cache communication protocol ("WCCP"). Similarly, data collectors may be implemented in any mail server and is not limited to mail servers that implement milter. Data collectors may be implemented at any point in one or more networks.

Those skilled in the art will appreciate that although FIG. 1 depicts a limited number of digital devices, collectors, routers, access points, and firewalls, there may be any kind and number of devices. For example, there may be any number of security servers 108, end-user devices 110, intrusion prevention system ("IPS") collectors 112a and 112b, firewalls 114*a* and 114*b*, ICAP/WCCP collectors 116, milter mail plug-ins 118, switches 120, and/or access points 124. Further, there may be any number of data center networks 102 and/or production networks 104. The data collectors can take the form of a hardware appliance, pure software running on a native operating system ("OS"), or virtual appliance for virtualized platforms like Amazon Web Services ("AWS") and VMWare.

Figure 2:
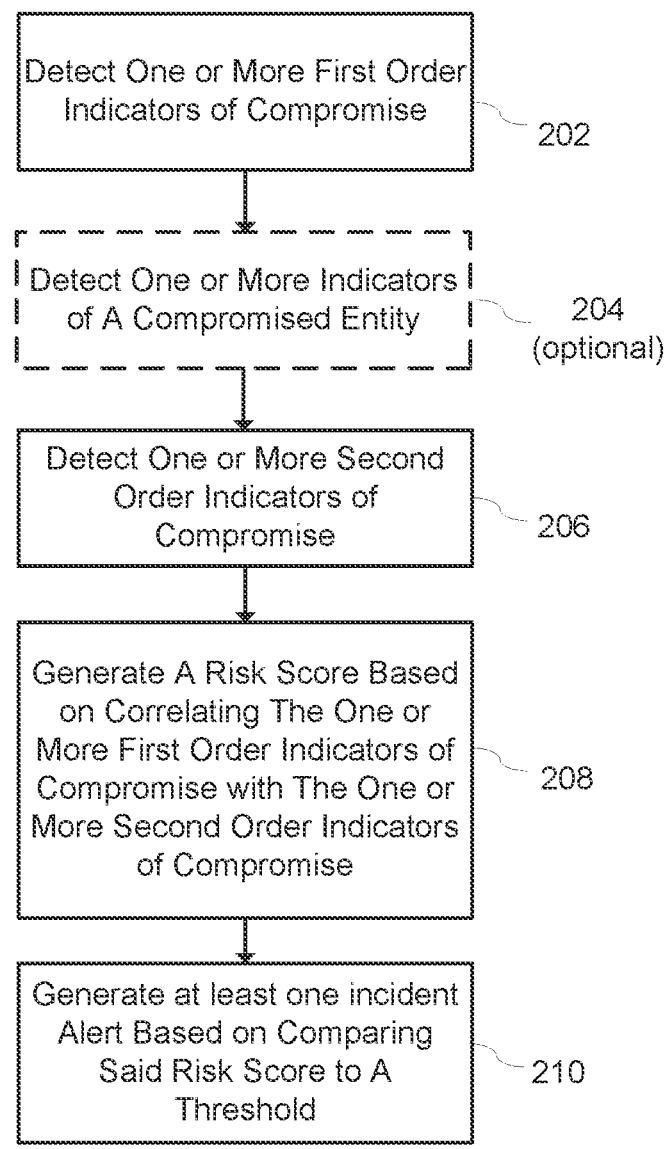
FIG. 2 illustrates a flow diagram of a method to detect threat activities on a network according to an embodiment.

FIG. 2 illustrates a block diagram of a method to detect threat activities on a network according to an embodiment. The method includes detecting one or more first order indicators of compromise (202). For an embodiment one or more data collectors are configured to intercept network data between network devices. For example, a data collector is configured to detect network traffic and to determine traffic patterns across the protocol stack between network devices. A data collector, for an embodiment, is configured to determine traffic patterns between network devices on one or more of protocol stack layers including, but not limited to, layers 2-7. For example, the data collector may be configured to detect and to determine traffic patterns for address resolution protocol ("ARP") traffic, dynamic host configuration protocol ("DHCP") traffic, Internet control message protocol ("ICMP") traffic between media access control ("MAC") or Internet protocol ("IP") addresses, transmission control protocol ("TCP")/IP and user datagram protocol ("UDP")/IP traffic between IP and port number pairs, up the stack to hypertext transfer protocol ("HTTP"), secure shell ("SSH"), server message block ("SMB") application protocols, patterns between application clients and servers, and industry-specific applications like wire transfer transaction processing, and patterns between bank accounts. The data collector is configured to extract file objects transferred along with their meta information such as HTTP headers, URLs, source and destination IP addresses, and to transmit the file objects to a security server.

Further, the method optionally includes detecting one or more indicators of a compromised entity (204). A compromised entity includes, but is not limited to, a digital device, an application, and a rogue user on a network. For an embodiment, a system includes one or more data collectors configured to operate as a honey-host used to attract the interest of any one of malicious software, a rogue user, a digital device performing threat activities. An indicator of a compromised entity includes, but is not limited to, an attempt to prove a honey-host for open ports (that is, test the honey-host for open ports) to gain access to the honey-host, and an attempt to examine or move data on a honey-host. For example, a data collector is configured to have one or more of an interesting domain name and IP address (that is, a domain name and/or an IP address that a compromised entity would attempt to access); it is given an owner/user with interesting corporate roles, relevant data files, documents, and user activity traces. Further, a data collector, for an embodiment, is configured to log any probing, login, and access activities against this honey-host. The logged data will, e.g., identify which device, application, and user(s) have attempted any activities, at what time, along with the details of the activity. For example, if files are copied from the honey-host, a data collector is configured to log information including the file name, hash, and where the file is moved to.

Further, the method includes detecting one or more second order indicators of compromise (206). Second order indicators of compromise include, but are not limited to, behavior patterns of a network device observed from the network device and behavior patterns of an end-user device. For example, a data collector is configured to generate an event log and/or a transaction log for the network device. Further, a data collector, for an embodiment, is configured to detect behavior patterns of an end-user device, endpoint device, and/or other client peers on a network, for example as used by a user, based on network traffic, from a business activity level. An example of detecting behavior patterns of an end-user device in a software engineering environment includes detecting that an individual developer's workstation started to pull down a large amount of source code from one or more repositories while at the same time, very little push (updating to the repositories) is taking place. This kind of suspicious conditions is detected by continuous monitoring and building typical pattern profiles. In such an example, the system is configured to generate an alert when the observed behavior patterns deviate from the typical profiles. Another example of detecting behavior patterns of an end-user device includes in a bank environment which well-known interaction patterns among the desktop computers of different functional departments are established from the business workflow using techniques including those described herein. In such an environment, a human resource manager's machine will not generally communicate with a wire-transfer processing server; any direct network connectivity outside an information technology ("IT") maintenance window will generate an alert for a second order suspicious indicator. Thus, the detection a data collector is configured to detect these types of behavior patterns using techniques including those described herein.

The method also includes generating a risk score based on correlating the one or more first order indicators of compromise with the one or more second order indicators of compromise (208). For an embodiment, the risk score is generated based on an asset value assigned to a network device or end-user device and the current security posture of the network device or end-user device. For example, if the network device is assigned a high asset value the generated risk score would be higher for the same correlation result than a network device assigned a lower asset value. In addition, a device having a security posture above a normal or a defined average level (e.g., more sensitive to attacks) would result in the generated risk score being higher than a correlation result of a network device having a security posture at or below normal. For an embodiment, a generated risk score based on a security posture is more dynamic than a generated risk score based on an asset value. For example, based on the threat intelligence in the wild (that is, threat intelligence gain through monitoring other networks), a security server is configured to determine that some group of devices or users may be subject to a targeted attack and warrant special monitoring. In such an example, the security posture can be increased for the devices or users for the given period of time (e.g., a high security posture) so that the risk score for any threat against these devices or users will be applied an escalation factor in order to prioritize the response.

For an embodiment, a data collector is configured to correlate one or more first order indicators of compromise with the one or more second order indicators of compromise based on network patterns/data received from one or more data collectors using techniques including those described herein. Further, the data collector is configured to generate a risk score based on the correlation result using techniques including those described herein. For another embodiment, a security server is configured to correlate one or more first order indicators of compromise with the one or more second order indicators of compromise based on network patterns/ data received from one or more data collectors using techniques including those described herein. Further, the security server is configured to generate a risk score based on the correlation result using techniques including those described herein. Using many data collectors communicating with a security server, a hierarchy of data aggregation and abstraction can be created to scale the coverage to larger networks and to support filtered sharing of threat intelligence data. For example, a single collector may cover the network of a single department at a given site having many departments. The data from multiple collectors of corresponding departments at the site can be aggregated to represent the entire site.

Further, the method includes generating at least one incident alert based on comparing the risk score to a threshold (210). The incident alert includes lateral movement and data exfiltration incident alerts. For an embodiment, multiple alerts will aggregate in time when multiple events of the same type happen within a short period of time to the same target device. The aggregation is achieved by representing the number of occurrences of the same events within the given interval by one single alert as an incident. This will result in a more meaningful alert to the end user, without loss of important information, while avoiding generating many events to the user.

In addition, an alert may be generated based on a security policy. For example, a security policy may include, but is not limited to, a watch-list of one or more critical internal IP addresses and a red-list, which includes known malicious addresses, of one or more external IP addresses. In such an example, an incident alert would be generated when a network device or end-user device communicates with an IP address on the watch-list and/or on the red-list. For an embodiment, a data collector is configured to generate at least one incident alert based on comparing the risk score to a threshold using the techniques describe herein. For another embodiment, a security server is configured to generating at least one incident alert based on comparing the risk score to a threshold using the techniques describe herein. Between the data collectors and security server, a hierarchy of data aggregation and abstraction can be created to scale the coverage to larger networks and to support filtered sharing of threat intelligence data. For example, a single data collector may cover the network of a single department at a given site; data from multiple collectors of corresponding departments can be aggregated to represent the given site as a whole.

Figure 3:
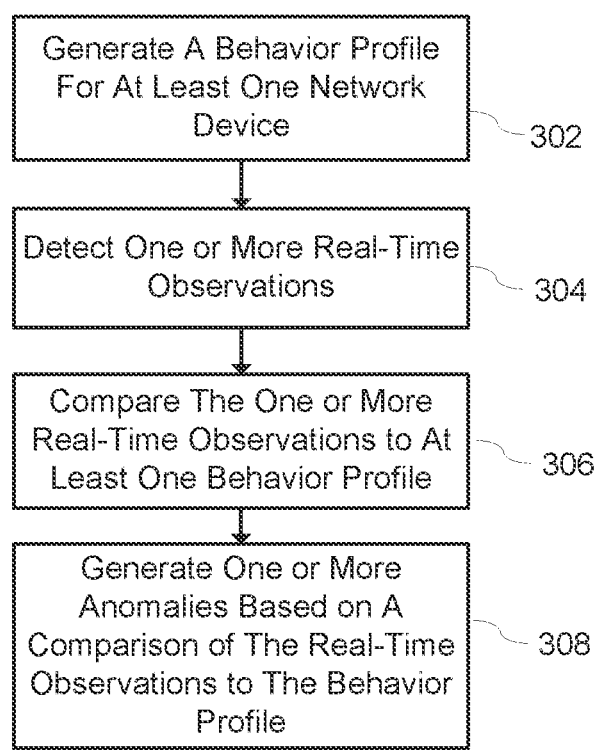
FIG. 3 illustrates a block diagram of a method to detect one or more second order indicators of compromise according to an embodiment.

FIG. 3 illustrates a block diagram of a method to detect one or more second order indicators of compromise according to an embodiment. The method includes generating a behavior profile for at least one network device or end-user device (302). For example, a behavior profile is generated at multiple levels of activities across the protocol stack using heuristics or supervised or unsupervised machine learning. An example of a behavior profile for an end-user device includes, but is not limited to, a network user's role in a network and authorization to use the end-user device on the network, one or more activities a network user performs on the end-user device, a list of one or more IP addresses that this device connects to on a weekly basis, a distribution of the time duration for one or more connections, a total amount of data exchanged, a breakdown of the amount of data in each direction, and a characterization of variances in any of the above information over a period of time. The detection mechanism, such as a data collector, maintains a behavior profile on a rolling basis (a long-term behavior profile). At the same time, according to an embodiment, the detection mechanism is configured to build a real-time behavior profile; e.g., based on normalized daily stats. For an embodiment, the difference between a long-term behavior and a real-time behavior profile will raise an alert for a threat activity.

According to an embodiment, the behavior profiles are generated for each of the monitored network devices and end-user devices during a training phase. For an embodiment, a security server is configured to generate one or more behavior profiles based on one or more of network traffic patterns, behavior patterns of a network device, and behavior patterns of an end-user device. For another embodiment, a data collector is configured to generate one or more behavior profiles based on one or more of network traffic patterns, behavior patterns of a network device, and behavior patterns of an end-user device.

The method also includes detecting one or more real-time observations (304). These real-time observations are represented as real-time behavior profiles. Detecting one or more real-time observations, according to an embodiment, is part of a production phase. For an embodiment, a data collector is configured to intercept network data and analyze network traffic patterns across the protocol stack in real time to generate real-time observations using techniques including those described herein. For another embodiment, a data collector is configured to intercept network data and transmit the network data to security server using techniques including those described herein. The security server is configured to receive the network data and analyze the network traffic patterns across the protocol stack in real time to generate real-time observations.

Moreover, the method includes comparing the one or more real-time observations to at least one behavior profile (306), i.e., a long-term behavior profile. For example, real-time observations are compared against one or more generated behavior profiles. Comparing the one or more real-time observations to at least one behavior profile, according to an embodiment, is part of a production phase. For an embodiment, a data collector is configured to compare the real-time observations of a network device and/or an end-user device to at least one behavior profile generated for the network device or the end-user device using techniques including those described herein. For another embodiment, a security server is configured to compare the real-time observations of a network device or an end-user device to at least one behavior profile generated for the network device or the end-user device based on information received from one or more data collectors using techniques including those described herein.

Further, the method includes generating one or more anomalies based on a comparison of the real-time observations to the behavior profile (308). Generating one or more anomalies based on a comparison of the real-time observations to the behavior profile, according to an embodiment, is part of a production phase. The anomalies generated include, but are not limited to, network anomalies, device anomalies and user anomalies. A network anomaly includes the real-time networking traffic pattern observations that differ from the one or more behavior profiles. A device anomaly includes the real-time device behavior observations that differ from the one or more behavior profiles of the network device or the end-user device. A user anomaly includes the real-time observations of behavior of an end-user device under the control of a network user that differs from the one or more behavior profiles of the end-user device under control of the user. In addition to comparing the real-time observations against the one or more behavior profiles, the real-time observations may be compared against one or more of a network anomaly, a device anomaly, and a user anomaly. For an embodiment, a security server is configured to generate one or more anomalies based on data received from one or more data collectors including the data described herein. Further the anomalies, according to an embodiment, are correlated with the first order indicators of compromise based on one or more of a security policy, an IP address, a device finger print, a business application, and a user identity. For another embodiment, a data collector is configured to generate one or more anomalies using techniques including those described herein.

Further, one or more indicators of a compromised entity detected by one or more honey-hosts are correlated with both one or more first order indicators and one or more second order indicators, to identify any of a network device, an application that may have been compromised, and to identify a user, such as a rogue user, on an end-user device initiating suspicious activities on the network. Some examples of suspicious activities include probing for high-value assets or gathering sensitive information from the honey-hosts. An exemplary implementation includes a system configured to detect sensitive data using expression matching using techniques including those described herein. For example, sensitive data includes social security numbers, credit card numbers, and documents including keywords. The system according to an embodiment is configured to detect suspicious outbound data movement using techniques including those described herein. For an embodiment, the system is configured to detect suspicious outbound data movement using heuristics rule watching for an HTTP POST request where the headers claim to be a plaintext body but the body content of the request shows a high entropy value, which suggests compression or encryption. Further, the system is configured to detect abnormal network transactions based on one or more anomalies using techniques including those described herein. For example, the system is configured to detect transactions falling outside of a determined behavior pattern such as a large amount of encrypted file transfers to a host for the first time. The system is also configured to detect and record all malware infections and command-and-control ("CNC") activities in a network using the techniques including those described herein.

Moreover, the system is configured to support a general policy framework. For example, a security policy is used to define the type of traffic patterns and/or behaviors that are detected and the alerts generated for a given security posture. For example, a security posture may include a range from DefCon1 to DefCon5. In such an example, DefCon5 is the highest security posture indicating a high awareness or sensitivity to anomalies or other detections and DefCon3 may be considered a normal posture indicating an average level of awareness or sensitivity to anomalies or other detections. And, the security posture levels under DefCon3 would indicate a lower level of awareness or sensitivity to anomalies than DefCon3.

For a system configured to use a security posture as described above, under a DefCon3, anomaly events such as detecting sensitive data movement, suspicious outbound data movement, or abnormal network transactions will be correlated with detected events such as detected malware infections and control-and-command activities. The system will generate an incident alert if an IP address of an anomaly event matches with an IP address related to the detected events or an IP address included in a security policy. In the case when the security posture is DefCon5, the system is configured to generate an incident alert upon a based on any anomaly event, without the requirement for an IP address to be included in the security policy or the detection of one or more detected events.

FIG. 4 illustrates an embodiment of a client, an end-user device, or a digital device that includes one or more processing units (CPUs) 402, one or more network or other communications interfaces 404, memory 414, and one or more communication buses 406 for interconnecting these components. The client may include a user interface 408 comprising a display device 410, a keyboard 412, a touchscreen 413 and/or other input/output device. Memory 414 may include high speed random access memory and may also include non-volatile memory, such as one or more magnetic or optical storage disks. The memory 414 may include mass storage that is remotely located from CPUs 402. Moreover, memory 414, or alternatively one or more storage devices (e.g., one or more nonvolatile storage devices) within memory 414, includes a computer readable storage medium. The memory 414 may store the following elements, or a subset or superset of such elements:

- an operating system 416 that includes procedures for handling various basic system services and for performing hardware dependent tasks;
- a network communication module 418 (or instructions) that is used for connecting the client to other computers, clients, servers, systems or devices via the one or more communications network interfaces 404 and one or more communications networks, such as the Internet, other wide area networks, local area networks, metropolitan area networks, and other type of networks; and
- a client application 420 including, but not limited to, a web browser, a document viewer and other applications; and
- a webpage 422 including one generated by the client application 420 configured to receive a user input to communicate across a network with other computers or devices.

According to an embodiment, the client may be any device that includes, but is not limited to, a mobile phone, a computer, a tablet computer, a personal digital assistant (PDA) or other mobile device.

FIG. 5 illustrates an embodiment of a server or a network device, such as a system that implements the methods described herein. The system, according to an embodiment, includes one or more processing units (CPUs) 504, one or more communication interface 506, memory 508, and one or more communication buses 510 for interconnecting these components. The system 502 may optionally include a user interface 526 comprising a display device 528, a keyboard 530, a touchscreen 532, and/or other input/output devices. Memory 508 may include high-speed random access memory and may also include non-volatile memory, such as one or more magnetic or optical storage disks. The memory 508 may include mass storage that is remotely located from CPUs 504. Moreover, memory 508, or alternatively one or more storage devices (e.g., one or more nonvolatile storage devices) within memory 508, includes a computer readable storage medium. The memory 508 may store the following elements, or a subset or superset of such elements: an operating system 512, a network communication module 514, a collection module 516, a data flagging module 518, a virtualization module 520, an emulation module 522, a control module 524, a reporting module 526, a signature module 528, and a quarantine module 530. An operating system 512 that includes procedures for handling various basic system services and for performing hardware dependent tasks. A network communication module 514 (or instructions) that is used for connecting the system to other computers, clients, peers, systems or devices via the one or more communication network interfaces 506 and one or more communication networks, such as the Internet, other wide area networks, local area networks, metropolitan area networks, and other type of networks.

A collection module 516 (or instructions) for detecting one or more of any of network traffic patterns, real-time observations, first order indicators, second order indicators, indicator of a compromised entity, and other suspicious data using techniques including those described herein. Further, the collection module 516 is configured to receive network data (e.g., potentially suspicious data) from one or more sources. Network data is data or network traffic that is provided on a network from one digital device to another. The collection module, for an embodiment, is configured to generate one or more behavior profiles for a network device using techniques including those describe herein. The collection module 516 may flag the network data as suspicious data based on, for example, whitelists, blacklists, heuristic analysis, statistical analysis, rules, atypical behavior, triggers in a honey-host, or other determinations using techniques including those described herein. In some embodiments, the sources comprise data collectors configured to receive network data. For example, firewalls, IPS, servers, routers, switches, access points and the like may, either individually or collectively, function as or include a data collector. The data collector may forward network data to the collection module 516.

For an embodiment, the data collectors filter the data before providing the data to the collection module 516. For example, the data collector may be configured to collect or intercept data using techniques including those described herein. In some embodiments, the data collector may be configured to follow configured rules. For example, if data is directed between two known and trustworthy sources (e.g., the data is communicated between two devices on a whitelist), the data collector may not collect the data. In various embodiments, a rule may be configured to intercept a class of data (e.g., all MS Word documents that may include macros or data that may comprise a script). In some embodiments, rules may be configured to target a class of attack or payload based on the type of malware attacks on the target network in the past. In some embodiments, the system may make recommendations (e.g., via the reporting module 526) and/or configure rules for the collection module 516 and/or the data collectors. Those skilled in the art will appreciate that the data collectors may include any number of rules regarding when data is collected or what data is collected.

For an embodiment, the data collectors located at various positions in the network may not perform any assessment or determination regarding whether the collected data is suspicious or trustworthy. For example, the data collector may collect all or a portion of the network traffic/data and provide the collected network traffic/data to the collection module 516 which may perform analysis and/or filtering using techniques including those described herein.

A data flagging module 518 (or instructions) may analyze the data and/or perform one or more assessments to the collected data received by the collection module 516 and/or the data collector to determine if the intercepted network data is suspicious using techniques including those describe herein. The data flagging module 518 may apply rules, compare real-time observations with one or more behavior profiles, generate one or more anomalies based on a comparison of real-time observations with at least one behavior profile, and/or correlate one or more first order indicators of compromise with one or more second order indicators of compromise to generate a risk score as discussed herein to determine if the collected data should be flagged as suspicious.

For an embodiment, collected network traffic/data may be initially identified as suspicious until determined otherwise (e.g., associated with a whitelist) or heuristics find no reason that the network data should be flagged as suspicious. The data flagging module 518 may perform packet analysis to look for suspicious characteristics in the header, footer, destination IP, origin IP, payload, and the like using techniques including those described herein. Those skilled in the art will appreciate that the data flagging module 518 may perform a heuristic analysis, a statistical analysis, and/or signature identification (e.g., signature-based detection involves searching for known patterns of suspicious data within the collected data's code) to determine if the collected network data is suspicious. A machine-learning based classification model may also be applied for the determination.

The data flagging module 518 may be resident at the data collector, at the system, partially at the data collector, partially at a security server 108, or on a network device. For example, a router may comprise a data collector and a data flagging module 518 configured to perform one or more heuristic assessments on the collected network data. A software-defined networking ("SDN") switch is an example of a network device configured to implement data-flagging and filtering functions. If the collected network data is determined to be suspicious, the router may direct the collected data to the security server 108.

For an embodiment, the data flagging module 518 may be updated. In one example, the security server 108 may provide new entries for a whitelist, entries for a blacklist, heuristic algorithms, statistical algorithms, updated rules, and/or new signatures to assist the data flagging module 518 to determine if network data is suspicious. The whitelists, entries for whitelists, blacklists, entries for blacklists, heuristic algorithms, statistical algorithms, and/or new signatures may be generated by one or more security servers 108 (e.g., via the reporting module 526).

The virtualization module 520 and emulation module 522 may analyze suspicious data for untrusted behavior (e.g., malware or distributed attacks). The virtualization module 520 is configured to instantiate one or more virtualization environments to process and monitor suspicious data. Within the virtualization environment, the suspicious data may operate as if within a target digital device. The virtualization module 520 may monitor the operations of the suspicious data within the virtualization environment to determine that the suspicious data is probably trustworthy, malware, or requiring further action (e.g., further monitoring in one or more other virtualization environments and/or monitoring within one or more emulation environments).

For an embodiment, the virtualization module 520 may determine that suspicious data is malware but continue to process the suspicious data to generate a full picture of the malware, identify the vector of attack, determine the type, extent, and scope of the malware's payload, determine the target of the attack, and detect if the malware is to work with any other malware. In this way, the security server 108 may extend predictive analysis to actual applications for complete validation. A report may be generated (e.g., by the reporting module 526) describing the malware, identify vulnerabilities, generate or update signatures for the malware, generate or update heuristics or statistics for malware detection, generate a report identifying the targeted information (e.g., credit card numbers, passwords, or personal information) and/or generate an incident alert as described herein.

For an embodiment, the virtualization module 520 may flag suspicious data as requiring further emulation and analytics in the back end if the data has suspicious behavior such as, but not limited to, preparing an executable that is not executed, performing functions without result, processing that suddenly terminates, loading data into memory that is not accessed or otherwise executed, scanning ports, or checking in specific portions of memory when those locations in memory may be empty. The virtualization module 520 may monitor the operations performed by or for the suspicious data and perform a variety of checks to determine if the suspicious data is behaving in a suspicious manner. Further, a virtualization module is configured to instantiate a browser cooking environment such as those described herein.

The emulation module 522 is configured to process suspicious data in an emulated environment. Those skilled in the art will appreciate that malware may require resources that are not available or may detect a virtualization environment. When malware requires unavailable resources, the malware may "go benign" or act in a non-harmful manner. In another example, malware may detect a virtualization environment by scanning for specific files and/or memory necessary for hypervisor, kernel, or other virtualization data to execute. If malware scans portions of its environment and determines that a virtualization environment may be running, the malware may "go benign" and either terminate or perform nonthreatening functions.

For an embodiment, the emulation module 522 processes data flagged as behaving suspiciously by the virtualization environment. The emulation module 522 may process the suspicious data in a bare metal environment (i.e., a pure hardware sandbox) where the suspicious data may have direct memory access. The behavior of the suspicious data as well as the behavior of the emulation environment may be monitored and/or logged to track the suspicious data's operations. For example, the emulation module 522 may track what resources (e.g., applications and/or operating system files) are called in processing the suspicious data.

For an embodiment, the emulation module 522 records responses to the suspicious data in the emulation environment. If a divergence in the operations of the suspicious data between the virtualization environment and the emulation environment is detected, the virtualization environment may be reconfigured based on behavior seen from the emulation environment. The new configuration may include removing one or more tracing instrumentation against the suspicious data. The suspicious data may receive the expected response within the new virtualization environment and continue to operate as if the suspicious data was within the targeted digital device. The role of the emulation environment and the virtualization environment and the order of using the environments may be swapped.

A control module 524 (or instructions) control module 524 synchronizes the virtualization module 520 and the emulation module 522. For an embodiment, the control module 524 synchronizes the virtualization and emulation environments. For example, the control module 524 may direct the virtualization module 520 to instantiate a plurality of different virtualization environments with different resources. The control module 524 may compare the operations of different virtualization environments to each other in order to track points of divergence. For example, the control module 524 may identify suspicious data as operating in one manner when the virtualization environment includes, but is not limited to, Internet Explorer v. 7.0 or v. 8.0, but operating in a different manner when interacting with Internet Explorer v. 9.0 (e.g., when the suspicious data exploits a vulnerability that may be present in one version of an application but not present in another version).

The control module 524 may track operations in one or more virtualization environments and one or more emulation environments. For example, the control module 524 may identify when the suspicious data behaves differently in a virtualization environment in comparison with an emulation environment. Divergence and correlation analysis is when operations performed by or for suspicious data in a virtual environment is compared to operations performed by or for suspicious data in a different virtual environment or emulation environment. For example, the control module 524 may compare monitored steps of suspicious data in a virtual environment to monitored steps of the same suspicious data in an emulation environment. The functions or steps of or for the suspicious data may be similar but suddenly diverge. In one example, the suspicious data may have not detected evidence of a virtual environment in the emulation environment and, unlike the virtualization environment where the suspicious data went benign, the suspicious data undertakes actions characteristic of malware (e.g., hijacks a formerly trusted data or processes).

When divergence is detected and further observation is needed, the control module 524 may re-provision or instantiate a virtualization environment with information from the emulation environment (e.g., switch between user-space API hooking and kernel tracing) that may not be previously present in the originally instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a significant threat.

For an embodiment, the control module 524 is configured to compare the operations of each virtualization environment in order to identify suspicious or untrusted behavior. For example, if the suspicious data takes different operations depending on the version of a browser or other specific resource when compared to other virtualization environments, the control module 524 may identify the suspicious data as malware. Once the control module 524 identifies the suspicious data as malware or otherwise untrusted, the control module 524 may continue to monitor the virtualization environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

A reporting module 526 (or instructions) is configured to generate a data model based on a generated list of events. Further a reporting module 526 is configured to generate reports such as an incident alert as describe herein. For an embodiment, the reporting module 526 generates a report to identify malware, one or more vectors of attack, one or more payloads, target of valuable data, vulnerabilities, command and control protocols, and/or behaviors that are characteristics of the malware. The reporting module 526 may also make recommendations to safeguard information based on the attack (e.g., move credit card information to a different digital device, require additional security such as VPN access only, or the like).

For an embodiment, the reporting module 526 generates malware information that may be used to identify malware or suspicious behavior. For example, the reporting module 526 may generate malware information based on the monitored information of the virtualization environment. The malware information may include a hash of the suspicious data or a characteristic of the operations of or for the suspicious data. In one example, the malware information may identify a class of suspicious behavior as being one or more steps being performed by or for suspicious data at specific times. As a result, suspicious data and/or malware may be identified based on the malware information without virtualizing or emulating an entire attack.

A signature module 528 (or instructions) is configured to classify network traffic/data based on said list of events. Further a signature module 528 is configured to store signature files that may be used to identify malware and/or traffic patterns. The signature files may be generated by the reporting module 312 and/or the signature module 528. In various embodiments, the security server 108 may generate signatures, malware information, whitelist entries, and/or blacklist entries to share with other security servers. As a result, the signature module 528 may include signatures generated by other security servers or other digital devices. Those skilled in the art will appreciate that the signature module 528 may include signatures generated from a variety of different sources including, but not limited to, other security firms, antivirus companies, and/or other third-parties.

For an embodiment, the signature module 528 may provide signatures which are used to determine if network traffic/data is suspicious or is malware. For example, if network traffic/data matches the signature of known malware, then the network data may be classified as malware. If network data matches a signature that is suspicious, then the network data may be flagged as suspicious data. The malware and/or the suspicious data may be processed within a virtualization environment and/or the emulation environment as discussed herein.

A quarantine module 530 (or instructions) is configured to quarantine suspicious data and/or network traffic/data. For an embodiment, when the security server 108 identifies malware or probable malware, the quarantine module 530 may quarantine the suspicious data, network data, and/or any data associated with the suspicious data and/or network data. For example, the quarantine module 530 may quarantine all data from a particular digital device that has been identified as being infected or possibly infected. For an embodiment, the quarantine module 530 is configured to alert a security administrator or the like (e.g., via email, call, voicemail, or SMS text message) when malware or possible malware has been found.

Although FIG. 5 illustrates system 502 as a computer it could be a distributed system, such as a server system. The figures are intended more as functional descriptions of the various features which may be present in a client and a set of servers than as structural schematics of the embodiments described herein. Thus, one of ordinary skill in the art would understand that items shown separately could be combined and some items could be separated. For example, some items illustrated as separate modules in FIG. 5 could be implemented on a single server or client and a single item could be implemented by one or more servers or clients. The actual number of servers, clients, or modules used to implement a system 502 and how features are allocated among them will vary from one implementation to another, and may depend in part on the amount of data traffic that the system must handle during peak usage periods as well as during average usage periods. In addition, some modules or functions of modules illustrated in FIG. 4 may be implemented on one or more one or more systems remotely located from other systems that implement other modules or functions of modules illustrated in FIG. 5.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A system for network management comprising:
one or more devices on a network to:
monitor network data transmitted over the network between a plurality of internal devices on the network and between at least one of the plurality of internal devices and at least one external device outside the network;
detect a first order indicator of compromise on the network based on the network data transmitted over the network;
detect a second order indicator of compromise on the network based on the network data transmitted over the network;
detect one or more indicators of a compromised entity detected by a honey-host;
correlate the one or more indicators of the compromised entity detected by the honey-host, the first order indicator of compromise on the network, and the second order indicator of compromise on the network,
wherein the compromised entity is one of the plurality of internal devices;
generate a risk score for the network data based on correlating the one or more indicators of the compromised entity detected by the honey-host, the first order indicator of compromise on the network, and the second order indicator of compromise on the network; and
generate a preventative action on data associated with the network based on comparing the risk score and a threshold.

2. The system of claim 1, wherein the one or more devices are further to:
detect the first order indicator of compromise on the network based at least in part on an analysis of east-west network traffic of the network data transmitted over the network; and
detect the second order indicator of compromise on the network based at least in part on an analysis of north-south network traffic of the network data transmitted over the network.

3. The system of claim 1, wherein the compromised entity includes one or more of:
a digital device,
an application, or
a rogue user on a network.

4. The system of claim 1, wherein the one or more devices are further to:
collect the network data based on the network data being identified as malicious or malware.

5. The system of claim 1, wherein the one or more devices are further to:
flag the network data as suspicious.

6. The system of claim 1, wherein first order indicator of compromise on the network includes one or more of:
an attempt to prove the honey-host for open ports to gain access to the honey-host, or an attempt to examine or move data on a honey-host; and
wherein the second order indicator of compromise includes a behavior pattern of the one or more devices observed from the one or more devices.

7. The system of claim 1, wherein the one or more devices are further to:
detect real-time observations of an end-user device, the end-user device being associated with the network;
compare the real-time observations and a behavior profile for the end-user device; and
generate one or more anomalies based on the comparison of the real-time observations and the behavior profile for the end-user device.

8. A non-transitory computer-readable medium storing instructions, the instructions comprising:
one or more instructions that, when executed by one or more processors of a device, cause the one or more processors to:
monitor network data transmitted over the network between a plurality of internal devices on the network and between at least one of the plurality of internal devices and at least one external device outside the network;
detect a first order indicator of compromise on the network based on the network data transmitted over the network;
detect a second order indicator of compromise on the network based on the network data transmitted over the network;
correlate one or more indicators of a compromised entity detected by a honey-host, the first order indicator of compromise on the network, and the second order indicator of compromise on the network,
wherein the compromised entity is one of the plurality of internal devices;
generate a risk score for the network data based on correlating the one or more indicators of the compromised entity detected by the honey-host, the first order indicator of compromise on the network, and the second order indicator of compromise on the network; and
generate a preventative action on data associated with the network based on comparing the risk score and a threshold.

9. The non-transitory computer-readable medium of claim 8, wherein the risk score is generated based on an asset value assigned to the device and a current security posture of the device.

10. The non-transitory computer-readable medium of claim 8, where the one or more instructions, when executed by the one or more processors, further cause the one or more processors to:
detect the first order indicator of compromise on the network based at least in part on an analysis of east-west network traffic of the network data transmitted over the network; and
detect the second order indicator of compromise on the network based at least in part on an analysis of north-south network traffic of the network data transmitted over the network.

11. The non-transitory computer-readable medium of claim 8, where the one or more instructions, when executed by the one or more processors, further cause the one or more processors to:
generate a behavior profile for at least one end-user device under control of a network user.

12. The non-transitory computer-readable medium of claim 8, wherein the compromised entity includes one or more of:
a digital device,
an application, or
a rogue user on a network.

13. The non-transitory computer-readable medium of claim 8, where the one or more instructions, when executed by the one or more processors, further cause the one or more processors to:
collect the network data based on the network data being identified as malicious or malware.

14. The non-transitory computer-readable medium of claim 8, where the one or more instructions, when executed by the one or more processors, further cause the one or more processors to:
flag the network data as suspicious.

15. A method comprising:
monitoring, by a device, network data transmitted over the network between a plurality of internal devices on the network and between at least one of the plurality of internal devices and at least one external device outside the network;
detecting, by the device, a first order indicator of compromise on the network based on the network data transmitted over the network;
detecting, by the device, a second order indicator of compromise on the network based on the network data transmitted over the network;
detecting, by the device, one or more indicators of a compromised entity detected by a honey-host;
correlating, by the device, the one or more indicators of the compromised entity detected by the honey-host, the first order indicator of compromise on the network, and the second order indicator of compromise on the network,
wherein the compromised entity is one of the plurality of internal devices;
generating, by the device, a risk score for the network data based on correlating the one or more indicators of the compromised entity detected by the honey-host, the first order indicator of compromise on the network, and the second order indicator of compromise on the network; and
generating, by the device, a preventative action on data associated with the network based on the risk score.

16. The method of claim 15, wherein risk score is generated based on an asset value assigned to the device and a current security posture of the device.

17. The method of claim 15, further comprising:
detecting the first order indicator of compromise on the network based at least in part on an analysis of east-west network traffic of the network data transmitted over the network; and
detecting the second order indicator of compromise on the network based at least in part on an analysis of north-south network traffic of the network data transmitted over the network.

18. The method of claim 15, further comprising:
detecting real-time observations of an end-user device, the end-user device being associated with the network;

comparing the real-time observations and a behavior profile for the end-user device; and generating one or more anomalies based on the comparison of the real-time observations and the behavior profile for the end-user device.

19. The method of claim 15, further comprising:

collecting the network data based on the network data being identified as malicious or malware.

20. The method of claim 15, wherein first order indicator of compromise on the network includes one or more of:

an attempt to prove the honey-host for open ports to gain access to the honey-host, or an attempt to examine or move data on a honey-host; and wherein the second order indicator of compromise includes one or more of:

a behavior pattern of the one or more devices observed from the one or more devices.

\* \* \* \* \*